United States Patent
Sproat et al.

(10) Patent No.: US 6,778,503 B1
(45) Date of Patent: Aug. 17, 2004

(54) AUTOMATED LINE SIGNAL PROCESSING

(75) Inventors: Martin Sproat, Stevenage (GB); Julian Frank Barry Cable, Stortford (GB); Simon Daniel Brueckheimer, London (GB); Michael Flynn Thomas, Plano, TX (US); Andrew Geoffrey Tomlins, Harlow (GB); David John Stacey, Stanstead Abbots (GB); John Andrew Shotton, Wickford (GB); Fai Tsang, South Woodham Ferrers (GB); Stephen Rylant Evans, Welwyn Garden City (GB); William Smith, Hertford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/145,826

(22) Filed: Sep. 2, 1998

(51) Int. Cl.[7] .................................................. H04J 1/16
(52) U.S. Cl. ........................................ 370/247; 370/352
(58) Field of Search ............................... 370/352, 395.1, 370/395.61, 395.2, 522, 523, 524, 902, 904–905, 241, 241.1, 242, 244, 248, 250, 252, 247, 251, 420, 474, 468, 465; 714/39, 47, 49

(56) References Cited

U.S. PATENT DOCUMENTS 5,251,204 A * 10/1993 Izawa et al. ................ 370/249
5,442,621 A * 8/1995 Ise et al. ..................... 370/251
6,009,106 A * 12/1999 Rustad et al. ............... 370/523

* cited by examiner

Primary Examiner—Dang Ton
Assistant Examiner—Phuc Tran
(74) Attorney, Agent, or Firm—Barnes & Thornburg

(57) ABSTRACT

A method and apparatus for handling persistence measurement of channel associated signaling for a plurality of line circuits, eg, T1, E1, OC3, STM 1 circuits, which extracts channel associated signaling data from a plurality of line circuits; assembles the channel associated signaling data into a data frame; contains the data frame in a suitable carrier, eg, an AAL 0 cell; monitors a continuous stream of the data frames, to check for changes in line status; and generates an event message data frame when a persistent change of line state has been detected. The extracting of associated signaling data may be provided on a separate card to a call control processor, and using separate processor functionality. A data processing load of a prior art call control processor which would otherwise be taken up in channel associated signaling persistence measurements may be alleviated, and the data processing burden on a prior art call control processor for handling persistence measurements is separated off and handled by the data processing apparatus and method according to the present disclosure.

10 Claims, 10 Drawing Sheets

Figure 2 Signalling Processor Flowchart

| Data Clock Tick | Counter Store (16 bit) | Data Store (8 bit) | Algorithm PROM (16 bit) | Cell I/F (8 bit) | Equiped Table (16 bit) |
|---|---|---|---|---|---|
| 1 | | | Circuit No | RBS/Tone (new) | |
| 2 | Counter A (old) | RBS Tone (old) | | | Algorithm No |
| 3 | Counter B (old) | (Compare Tone State) | | | Current State |
| 4 | | Control Word | | | |
| 5 | (Update affected counters) | Update RBS/ Tone data | Persistence Trigger A | | |
| 6 | Output Updated Counter A | | Persistence Trigger B | | |
| 7 | Output Updated Counter B | | State if A matures | | |
| 8 | | | State if B matures | | |
| 9 | | | State RBS etc Change | | |
| 10 | | | Event No: | | Update Current State |

*Fig.10*

| Data Clock Tick | Counter Store (16 bit) | Algorithm PROM Input (16 bit) | Equiped Table (16 bit) |
|---|---|---|---|
| 0 | | Circuit No | |
| 1 | Counter A (old) | | Algorithm No |
| 2 | | Control Word | Current State |
| 3 | (Update affected counters) | Persistence Trigger A | |
| 4 | Output Updated Counter A | State if A matures | |
| 5 | | Update RBS bits | Update Current State |

*Fig.12*

AUTOMATED LINE SIGNAL PROCESSING

FIELD OF THE INVENTION

The present invention relates to processing of line state signaling in communications networks, and particularly although not exclusively for processing of channel associated signaling in circuit switched networks such as Asynchronous Transfer Mode (ATM) networks.

BACKGROUND OF THE INVENTION

Conventional telecommunication systems handling telephony and other circuit switched data calls comprise a plurality of central office exchange switches each communicating with each other to form a national and/or international network, each central office switch communicating with a large number of subscriber apparatus, for example, telephone handsets, fax machines, modems. In general each subscriber apparatus is connected to a local exchange over one or a plurality of line circuits. Each line circuit is bi-directional, having two channels. FIG. 1 herein illustrates schematically part of a conventional telecommunications network comprising a plurality of subscriber terminals 100–103, each subscriber terminal connected to a corresponding local exchange apparatus 104, 105, the local exchanges being interconnected as part of a larger network, for example an international network comprising a plurality of international exchanges 106, 107. Set up and termination of calls between individual user terminals is initiated by a sequence of signals passed between the subscriber terminals, the local exchanges and the international exchanges. Typically, such signaling comprises a number of different tone sequences, for example a call waiting indication tone; a recall dial tone; a message waiting tone; a confirmation tone, a ringing tone; a line busy tone; a reorder tone; a receiver off hook tone; and a continuity check tone. Analog tone levels at transmitting and receiving user terminals are defined in International Telecommunications Union (ITU) recommendations ITU Q.312 and ITU Q.213. For example, to set up a call, a user may pick up a telephone handset which results in an off hook line seizure signal which is converted into a digital bit stream, either at the telephone handset, or at the local exchange, and which is monitored by a call control processor at the local exchange. The off hook signal is followed by a plurality of dial tone signals representing telephone numbers, which are converted into a digital bit stream either at the subscriber terminal, or at the local exchange. The off hook signal is converted at the first local exchange into a digital bit stream and is then routed by the call control processor over the entire telecommunications network to a destination specified by the dial tones. For example in the case illustrated schematically in FIG. 1, the off hook signal generated by first user terminal 100 is received at first local exchange 104. After a predetermined number of digits have been dialed at first user terminal 100, local exchange 104 recognizes that a call has to be routed to first international exchange 106 and generates a seizing signal, comprising a pattern of bits which is communicated to first international exchange 106 by first local exchange 104. Similarly, first international exchange 106 on receiving the seizing condition signal from first local exchange 104 recognizes the seizing condition signal and generates a further seizing condition signal to second international exchange 107, and so on as the call propagates across the network and is routed to second local exchange 105 to which the destination of the call, ie, second user terminal 102, is connected. At each exchange, there is a delay in processing the signaling. The signals can only change every 1.5 to 2 ms. Further, the signals themselves have a duration, depending upon the type of signal. Each exchange monitors a plurality of line circuit channels, and on receiving a signal on a circuit will only recognize that signal after the signal has persisted for a predetermined duration. For example, where first user terminal 100 generates an off hook signal, first local exchange 104 monitoring a line to which the first user terminal is connected must determine that the off hook signal has persisted for a predetermined duration, before the first local exchange will recognize the signal as a valid off hook signal. Typically, such predetermined duration is of the order of 10 ms. Further, each intervening exchange, ie, first international exchange 106, second international exchange 107 and second local exchange 107 requires the off hook signal to persist for a minimum duration of 10 ms before the relevant exchange will recognize the off hook signal as being valid. At each exchange, changes in a line state must persist for a predetermined duration before the corresponding call control process of a local exchange recognizes that line change state as being valid. Thus, for a 14 digit dialed national telephone code, typically a maximum of the order of 8 to 10 exchanges would be involved. The delay at each exchange would comprise a 10 ms delay to confirm persistence of a line change state, plus a delay incurred by the local call control processor to process the line change state and signal to a next exchange. Over an extended telecommunications network, call set up may take of the order of 0.5 seconds in all. At each exchange, each line connected to that exchange is periodically polled by the call control processor, checking for changes in line state on each line repetitively every 1 or 2 ms. This places a data processing burden on the call control processors. The data processing requirement for checking each line at an exchange every 1 or 2 ms includes the processing overhead of polling the line, retrieving line state data from the line, comparing the received line state data with a previously received line state data from the same line and determining whether a change has occurred, and if a change is determined to have occurred on the line, performing additional signal processing to check whether that change in line state persists on that line, ie, counting the number of times which a line has been in a particular state. The call control processor carries out the polling procedures on an interrupt basis, interrupting its normal call control data processing operations to check each line individually. Thus, the call control processor is not doing useful call control processing operations during this time, but is performing data processing associated with persistence monitoring operations of line state.

For example, during an average 3 minute call, less than 30 seconds will be spent performing dialing and initial call set up. This requires generation of 5 message events thus, in a typically longest national dialed call there will be 14 digits dialed, giving 14 dialed digit events, plus an initial seizure event. Thus, when a subscriber goes off hook and dials a 14 digit number, assuming each individual line state is aggregated, then in one direction from the subscriber to the exchange, in 3 minutes there are 15 events transmitted on one line. If the signaling is being handled by the conventional call control processor which polls every 1.5 ms, there are of the order 660 polls per second, or about 39,000 polls per minute, so over the duration of the 3 minute call the processor may poll the line state over 100,000 times. Considering that each exchange may handle a large number of calls at any one time, the data processing burden on the call control processor due to the line state persistence measurement consumes a significant proportion of the data processing capacity of the processor.

Thus, as the number of lines which a single call control processor is required to service increases, the data processing burden due to the line state persistence measurement process increases for that processor, at the expense of using data processing capacity which could otherwise be used for call control data processing operations.

SUMMARY OF THE INVENTION

One object of the present invention is to provide a method and apparatus for devolving the processing of persistence measurements of line state from the handling of call control signaling, thereby improving the efficiency of call control processing and the efficiency of line state persistence measurement processing.

Another object of the present invention is to integrate a system for handling devolved line state persistence measurement and call control processing with an Asynchronous Transfer Mode transport system.

According to a first aspect of the present invention, there is provided a signal processing apparatus for processing channel associated signaling data, said processing apparatus comprising:

interface means for interfacing with a plurality of line circuits for receiving circuit signals on said plurality of line circuits;

signaling extraction means receiving circuit signals from said interface, said signal extraction means extracting said channel associated signaling data from said circuit signals;

frame assembly means, for assembling said extracted channel associated signaling data relating to said plurality of line circuits into a plurality of data frames; and event message generation means operating to receive a plurality of said data frames, and to output an event message in response to a change of circuit status data contained within said data frames.

Said interface may comprise an interface for communicating etc, wherein said interface comprises an interface for communicating with a plurality of line circuits selected form the following set:

T1;
E1;
OC3;
STM 1.

Preferably, said event message generation means comprises:

data storage means for storing data describing a state of each of a plurality of said circuits;

means for comparing data signals contained in a currently received data frame, each said set of data signals relating to a current status of a said circuit;

means for comparing said stored status data with said currently received status data for each of said circuits; and means for generating an event message, when a said change of state is detected.

Preferably said signal processing apparatus further comprises:

means for assembling an event message data frame in response to a detected change of state of at least one said circuit.

Preferably said signal processing apparatus further comprises means for storing said event message data frames and for regulating a flow of said event message data frames onto a communications back plane.

According to a second aspect of the present invention, there is provided a signal processing apparatus for processing channel associated signaling data, said processing apparatus comprising:

means for receiving at least one event message describing a change of state of at least one line circuit; and means for generating a plurality of data frames, each said data frame comprising data describing a status of each of a plurality of said line circuits;

wherein a status data content of said data frames is changed in response to an event message contained within a said event message data frame.

The apparatus may further comprise a means for regulating a plurality of said output data frames for entry onto a communications back plane.

Said means for generating a plurality of said data frames preferably comprises;

a robbed bit signaling code generator means; and means for generating a plurality of tone signals, said tone signals relating to a each of a plurality of said circuits.

Preferably said means for generating a plurality of said data frames operate to continuously generate said data frames.

Preferably said means for receiving at least one event message comprises a store for storing a plurality of transport carriers containing said event messages.

Preferably said means for receiving at least one event message comprises a message buffer.

According to third aspect of the present invention, there is provided a method for processing channel associated signaling data of a plurality of communications channels, said method comprising the steps of:

extracting channel associated signaling data from channel signaling carried on each of said plurality of communications channels;

assembling said extracted channel associated signaling data of said plurality of communication channels into at least one data frame;

monitoring a plurality of said data frames to detect changes of line status of said plurality of communications channels; and generating an event message data frame in response to a said detected change of status.

Preferably said method further comprises the step of inserting a said event message data frame into transport carrier payload.

A said transport carrier payload may comprise a payload in accordance with a protocol selected from the set:

Asynchronous Transfer Mode (ATM);
Transmission Control Protocol (TCP);
Synchronous Digital Hierarchy (SDH).

Preferably a said event message data frame is inserted into an AAL 5 cell payload.

Said step of monitoring a plurality of said data frames may comprise:

sequentially inspecting each of a plurality of data locations within a said data frame, each said data location corresponding to an individual said communications channel line circuit; and comparing a content of each said data location within said data frame with a corresponding data location stored in a data storage device, said corresponding stored data location containing stored data relating to a previous state of said corresponding communications channel.

Preferably said step of monitoring a plurality of said data frames comprises:

checking a persistence of a said change of status by counting a number of said data frames over which channel associated signaling describing said status persists.

Preferably said step of assembling said extracted channel associated signaling data into a least one data frame comprises assembling channel associated data of at least one trunk into a single said data frame.

Preferably said channel associated signaling data corresponds to a trunk selected from the set:

a T1 trunk;
an E1 trunk;
an OC3 trunk;
an STM 1 frame;
is assembled into a single said data frame.

A said data frame may comprise an AAL 0 48 byte payload.

Preferably said method comprises the step of outputting said event message data frames asynchronously in response to a said detected change of status.

According to a fourth aspect of the present invention there is provided a method of processing channel associated signalling data of a plurality of line circuits, said method comprising the steps of:

assembling channel associated signaling data describing a current status of each of a plurality of said line circuits into a first data frame;

for each said line circuit, storing historical status data in a memory area;

for each said line circuit, comparing said current status data contained in said first data frame with said historical stored data; and if said current status data in said first data frame differs from said stored historical status data, assembling a second data frame type containing said current status data.

Said step of for each said line circuit comparing said current status data contained in said first data frame with said historical stored data may comprise:

monitoring each of a plurality of data locations in said first data frame, each said data location containing data describing a status of a corresponding said line circuit; and comparing a content of said data location with a content of a corresponding stored data location in a data storage device.

A said first data frame may comprise an AAL 0 payload, or an AAL 5 payload.

A second said data frame may comprise an AAL 0 payload or an AAL 5 payload payload.

Preferably said step of assembling channel associated signaling data comprises packing said channel associated signaling data into said data frame according to a predetermined packing algorithm.

According to a fifth aspect of the present invention there is provided a method of processing channel associated signalling data of a plurality of line circuits, said method comprising the steps of:

receiving a first input data frame containing data describing a current status of a said line circuit;

storing historical line status data describing an historical status of said line circuit;

comparing said current status data of said line circuit with said historical status data of said line circuit;

receiving at least one further input data frame containing further data describing a current status of said line circuit;

checking that said further data received in said further data frame corresponds with said current data received in said first data frame; and assembling said current data into at least one output data frame.

The invention includes a method of processing channel associated signalling data of a plurality of line circuits, said methods comprising the steps of:

assembling channel associated signaling data for each of a plurality of said line circuits into a data frame;

for each line circuit, storing historical status data in a memory area;

for each said circuit comparing said current status data contained in said data frame with said historical stored data;

if said current status in said data frame differs from said stored historical status data, assembling an event message data frame containing said current status data.

Specific embodiments according to the present invention may allow for a typical 3 minute call, a reduction from of the order of 100,000 interrupts to a call control processor to be replaced, in the case of, for example a 14 digit dialed call, by of the order of 15 signaling events.

The invention includes a signal processing apparatus for processing channel associated signaling data of a plurality of telecoms lines circuits, said processing apparatus comprising:

a plurality of interface means each interfacing with a plurality of line circuits for receiving circuit signals on said plurality of said line circuits;

a plurality of signal extraction means receiving said circuit signals from said plurality of interfaces, said signal extraction means extracting said channel associated signaling data from said plurality of circuit signals;

a plurality of frame assembly means, each for assembling said extracted channel associated signaling data relating to a corresponding respective plurality of respective line circuits into a plurality of data frames;

a plurality of event message generation means operating to receive a plurality of said data frames and to output an event message in response to a change of circuit status data contained within said data frames.

The invention includes a signal processing apparatus for processing channel associated signaling data, said processing apparatus comprising:

a plurality of means for receiving at least one event message describing a change of state of at least one line circuit; and a plurality of means for generating a plurality of data frames, each said data frame comprising data describing a status of each of a plurality of said line circuits;

wherein a status data content of said data frames is changed in response to an event message contained within a said event message data frame.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 10 illustrates schematically an example of data state changes relating to a single line circuit, as stored in a local memory of a discriminator of the monitoring apparatus of FIG. 8 herein;

FIG. 12 illustrates schematically an example of organization of data in the output channel, operation of which is described in relation to FIG. 11 herein.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
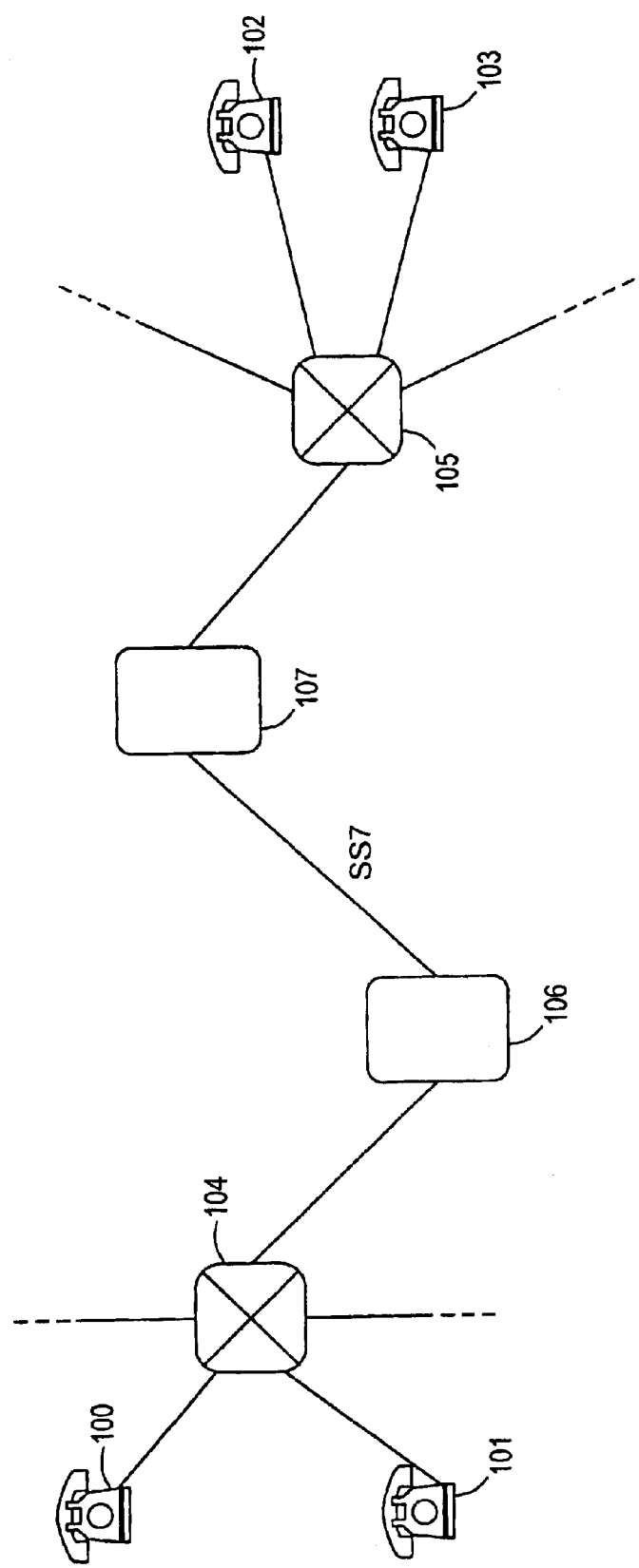
FIG. 1 illustrates schematically part of a prior art telecommunications network.
Figure 2:
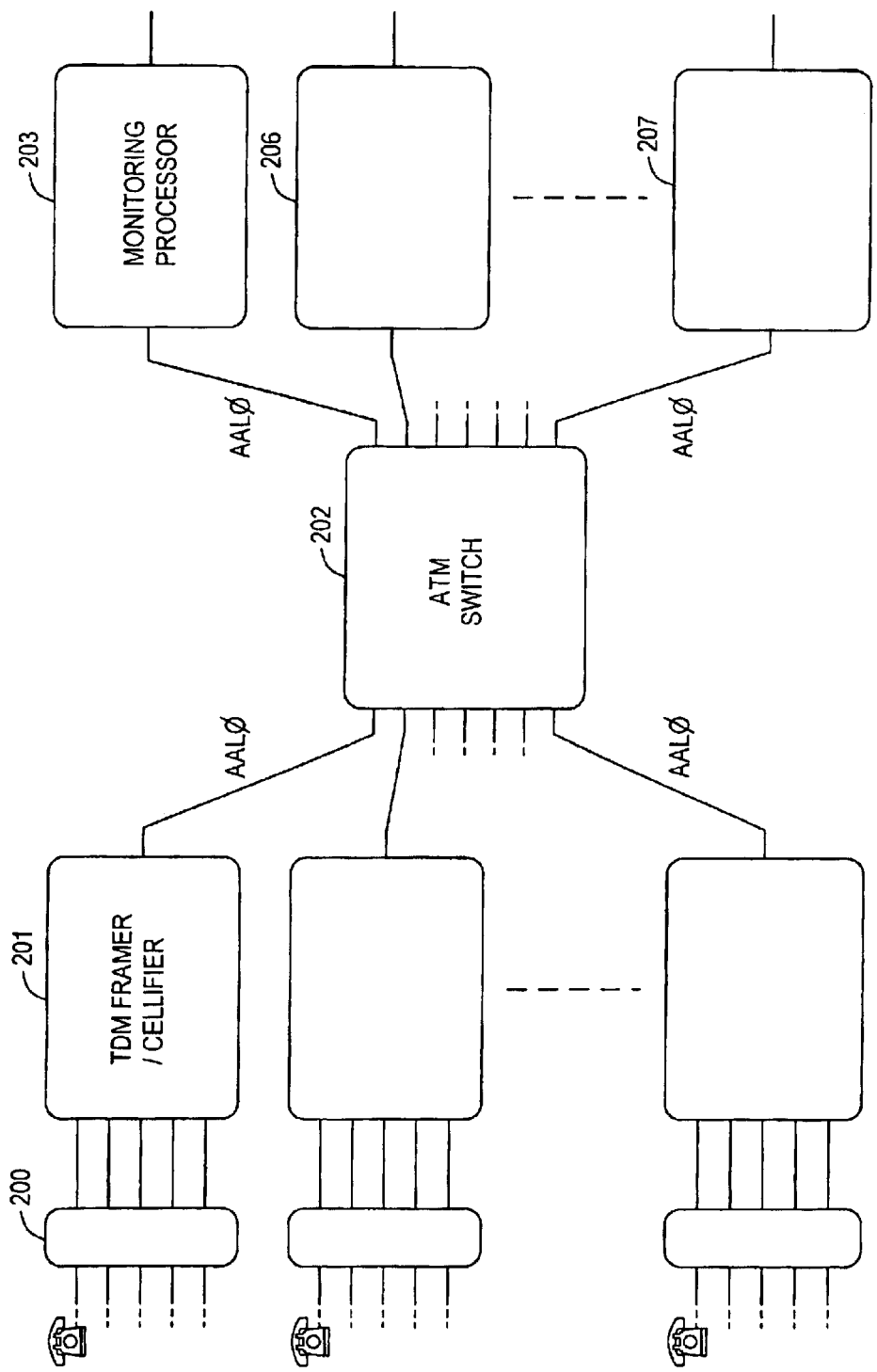
FIG. 2 shows schematically a line circuit signaling processing apparatus means according to specific implementation of the present invention.

Referring to FIG. 2 herein, there is illustrated schematically in block diagram form, a signal processing apparatus for handling channel associated signaling data of a plurality of incoming low level trunks according to a specific implementation of the present invention. A signal processing means comprises a trunk interface 200 connected to a plurality of low level incoming trunks each trunk comprising a plurality of bi-directional communications line circuits each having two channels; a Time Division Multiplex (TDM) framer and cellifier 201 communicating with the trunk interface 200, the framer-cellifier 201 receiving a plurality of low level trunk lines as inputs, and outputting a plurality of packets or cells, eg, Asynchronous Transfer Mode (ATM) cells, containing payload data describing channel associated signaling of the trunks; an ATM switch 202; and a monitoring processor 203 which receives a stream of the packets/cells output from time division multiplex (TDM) framer-cellifier 201 and continuously monitors the channel associated signaling data contained within those packets/cells, comparing the channel associated signaling (CAS) data for individual channels with previous values of channel associated signaling data for those same channels, to check whether there are any changes to the channel state, and if the monitoring processor 203 detects a change to the channel state, outputting a packet or cell containing changed channel associated signaling data.

Channel Associated signaling (CAS) includes but is not limited to: tone signaling, where a speech channel carries tones during call set up; Robbed Bit signaling (RBS), where bits of the speech payload are used to carry signaling; and TS16 channel associated signaling, where signaling bits are carried in defined places in a channel multiplex stream. Examples of CAS are found in ITU Recommendations G.703/721, Q.322, Q.323, Q.141, Q.143, Q.144, Q.311–313 and GR 506 Core.

The CAS signal processing apparatus illustrated in FIG. 2 may be constructed as a separate card in a telecoms switch and constructed using a separate processor from a call control processor used to perform call control operations for the same channels served by the CAS signal processing apparatus. TDM framer-cellifier 201 and monitoring processor 203 are implemented using separate digital signal processors from the call control processor, thereby relieving the call control processor of the signal processing burden of continuous channel status monitoring and persistence monitoring operations.

In practice, a plurality of such TDM framer/cellifiers 204, 205 may communicate via ATM switch 202 to a single monitoring processor 203. Further, a plurality of monitoring processes 203, 206, 207 may be provided connected to the ATM switch 203 over a plurality of ATM channels. ATM switch 202 provides a space switching function between the plurality of framer/cellifiers 201, 204, 205 and a plurality of monitoring processes 203, 206, 207. A single monitoring processor eg 203 may serve all the access signaling requirements of a single node. A plurality of access channels, eg T1, E1, DS3, E3, OC3, STM1 connected to a plurality of TDM framer/cellifiers may be served by a single monitoring processor.

Alternatively, traffic from a single TDM framer/cellifier 201 may have its channel access signaling requirements served by more than one monitoring processor. Each of the plurality of monitoring processors may act as a shared resource capable of serving a plurality of TDM framer/cellifiers. Hence, the signal processing means is scaleable to large size by provision of a plurality of TDM framer/cellifier means, and a plurality of monitoring processes interconnected by one or more ATM switches.

Figure 3:
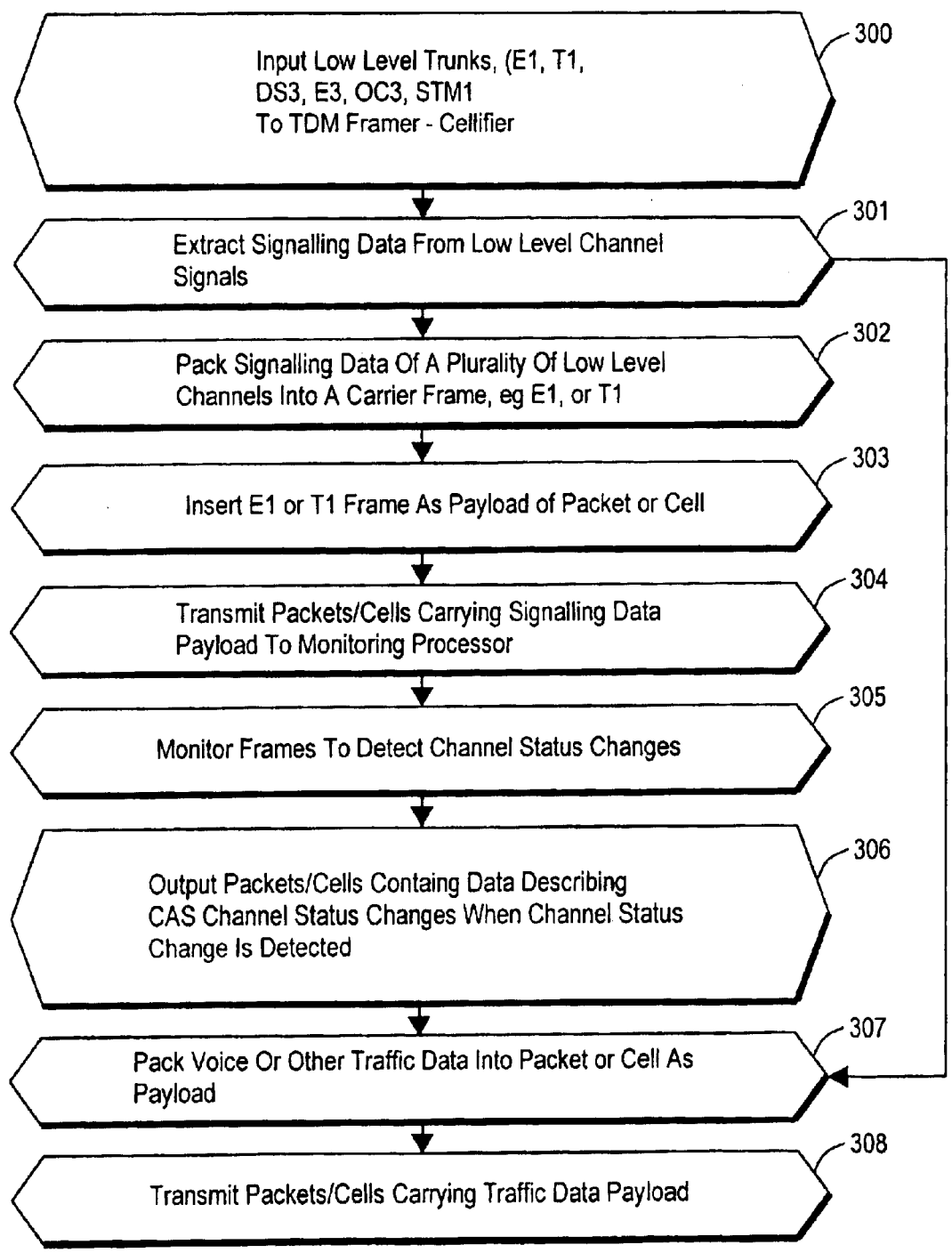
FIG. 3 illustrates schematically an overall line circuit monitoring process for monitoring a plurality of line circuits, carried out by the processing apparatus of FIG. 2.

Overall operation of the CAS signal processing apparatus, in relation to traffic signal processing of a plurality of channels is illustrated in general overview in FIG. 3 herein. The steps illustrated In FIG. 3 occur continuously and in parallel to each other for a plurality of contemporaneously received communications channels. In step 300, line circuit signaling from a plurality of low level channels, for example E1, T1, DS3, E3, OC3, or STM-1 channels containing data traffic, eg, voice traffic and channel associated signaling is received by interface 200, interface 200 being configured according to the particular type of channel being received. In step 301, signaling data bits are extracted from the signals on each of the channels received via interface 200, by the TDM framer-cellifier 201. Signaling data from each of the plurality of channels are assembled into a carrier frame in step 302. The preferred format of carrier frame comprises a T1 or E1 frame as will be described herein after. In step 303, the carrier frame is inserted as the payload of a packet or cell by TDM framer-cellifier 201 and transferred to monitoring processor 203 in step 304.

The monitoring processor monitors each of the frames to detect any changes in the CAS data which signify changes in channel status for each of the inspected line circuit channels on an ongoing basis in step 305. Newly received cell payloads relating to individual channels are compared with stored data from previously received cell payloads, to check whether any of the channels have undergone a status change, signified by the channel associated signaling data contained in a newly received cell payload. If a change in status of a channel is detected by monitoring processor 203, the processor outputs a packet or cell containing data describing the changed channel status in step 306. Production of a packet or cell containing data describing a changed channel status comprises an event message on that particular channel.

Thus, compared to the prior art case where each channel is continuously monitored for persistence of a state by a call control processor on an interrupt basis, in the specific methods and embodiments described in FIGS. 2 and 3 herein, persistence monitoring is achieved through continuous monitoring of CAS data stripped off from the remaining voice or other communications traffic data of a channel, the monitoring being performed separately from call control data processing, by monitoring processor 203.

Simultaneously with operation of monitoring processor 203 for continuous checking of channel status, in step 307 the voice or other traffic data comprising the channel from which the CAS data has been extracted, is packaged or inserted as the payload of a plurality of packets or cells, which are transmitted independently of the monitoring processor in step 308.

Whilst the general method of line circuit monitoring disclosed herein with reference to FIG. 3 is generic to a plurality of different transport modes, for example Asynchronous Transfer Mode, (ATM), Synchronous Digital Hierarchy (SDH), or Internet Protocol (IP), a specific embodiment according to the best mode herein has been developed in which cellification is based on Asynchronous Transfer Mode protocols. ATM systems are well known in the art.

Figure 4:
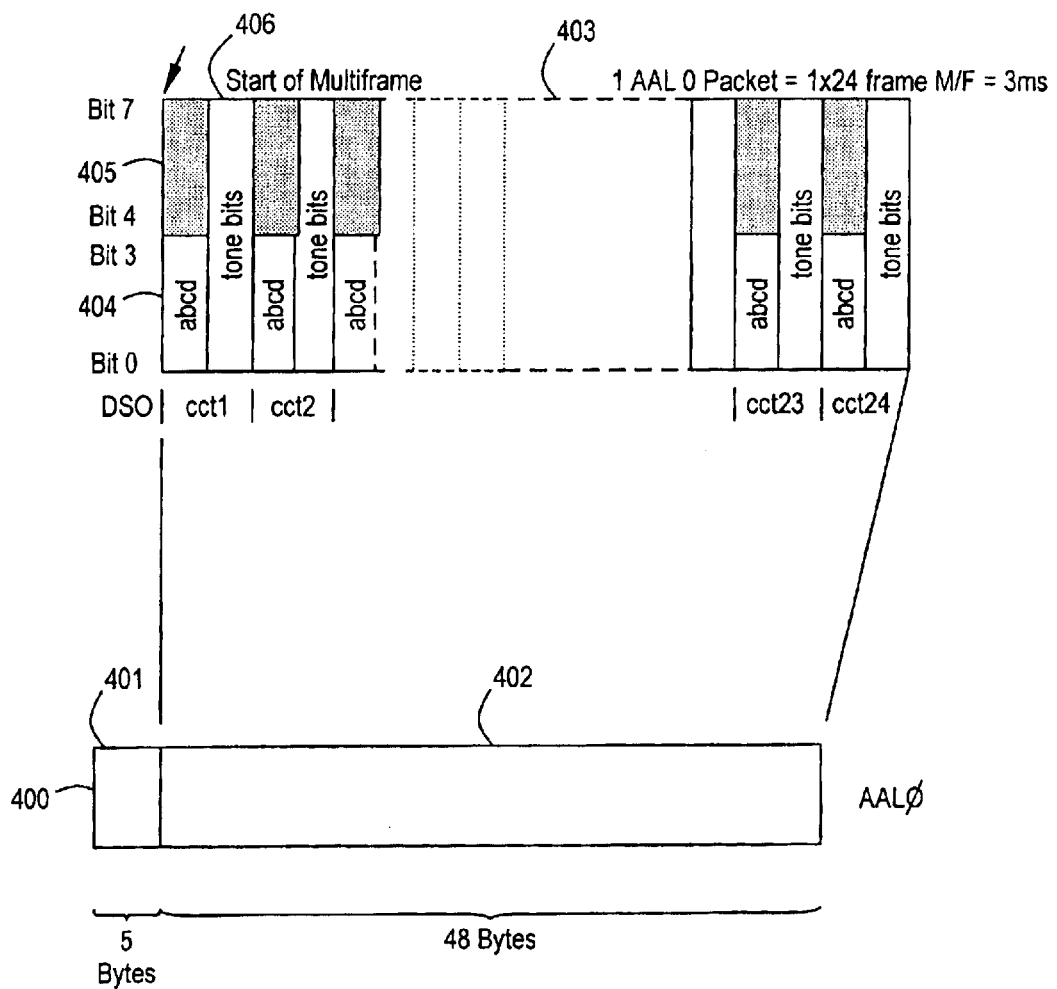
FIG. 4 illustrates schematically a first packing method for packing signaling data describing a T1 trunk into a 48 byte payload of an ATM adaptation layer 0 (AAL 0) cell.

Referring to FIG. 4 herein, there is illustrated schematically a process carried out by TDM framer-cellifier 201 in a best mode implementation in which channel associated signaling from a plurality of incoming channels is extracted from a data stream of the channel and assembled into a first data frame comprising a 48 byte payload of an ATM adaptation layer zero (AAL 0) cell. In the best mode herein an AAL 0 cell is used for containment of channel associated signaling data for convenience, since the 48 byte payload of an AAL 0 cell is convenient for packaging of CAS data of both E1, and T1 channels. Referring to FIG. 4 herein, AAL 0 cell 400 comprises a 5 byte header 401, followed by a 48 byte payload 402. In the case of a T1 multiframe input to interface 200, channel associated signaling for a complete T1 trunk of 24 T1 channels is packed into a single AAL 0 payload 403 as shown. Signaling data transferred between the time division multiplexed channels and the monitoring processor 203 comprises one byte and one nibble per DS 0.

For each circuit, channel associated signaling is packed into 2 bytes of the 48 byte ATM cell payload. For example, for a first circuit switched channel (cct 1) a first 4 bits 404 of the ATM cell payload contain a 4 bit robbed bit signaling data ABCD from a 24 frame multiframe. A successive 4 bits are left vacant, and a second byte of the ATM cell payload is reserved for a maximum of 8 bits of tone signaling data from either an MF detector, tone detector, or DTMF detector. By incorporating 4 vacant bits per DS 0, channel associated signaling for a 24 circuit channel T1 frame fits is contained in the 48 byte AAL 0 payload.

Figure 5:
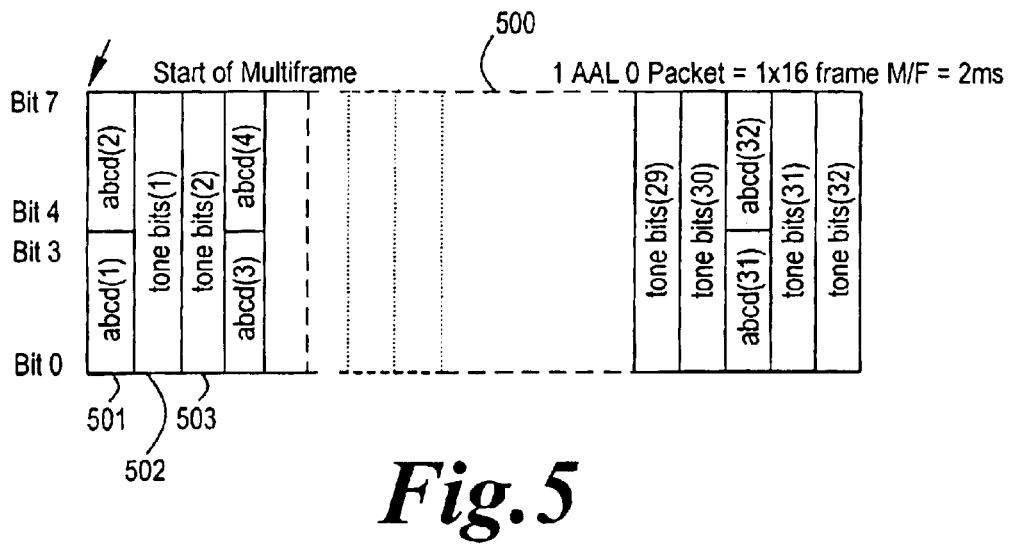
FIG. 5 illustrates schematically a second packing method for containing signaling data relating to an E1 frame In a 48 byte payload of an AAL 0 cell.

Referring to FIG. 5 herein, there is illustrated an alternative AAL 0 payload containing channel associated signaling data from an E1 16 frame multiplex. A first 3 bytes 501–503 of the payload are occupied by channel associated signaling data ABCD and tone signaling data of two E1 circuit switched channels. The channel associated signaling data of each channel occupies 4 bits of a single byte of the 48 byte ATM payload, followed by two successive bytes reserved for each of the two E1 circuit switched channels. This pattern is repeated 16 times, such that the channel associated signaling and tone bits of 32 individual E1 circuit switched channels occupies a single AAL 0 payload.

Figure 6:
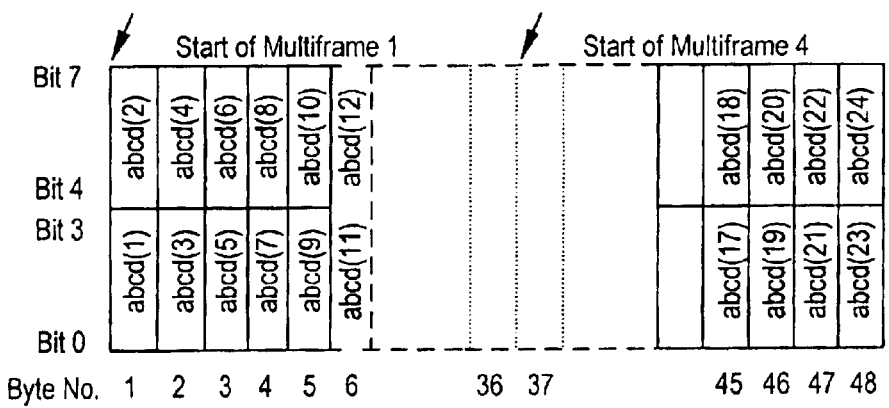
FIG. 6 illustrates schematically a third packing scheme for packing robbed bit signaling data relating to four T1 frames into a 48 byte AAL 0 cell payload.
Figure 7:
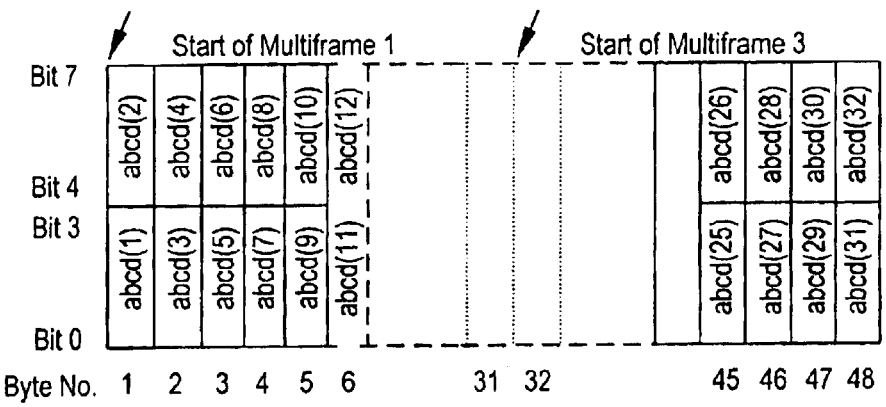
FIG. 7 illustrates schematically a fourth packing method for packing robbed bit signaling data describing circuits of three E1 frames into a 48 byte AAL 0 cell payload.

The packings of the AAL 0 payload illustrated in FIGS. 4 and 5 herein include incorporation of tone bit data within a same payload as line state signaling data (ABCD). However, handling of the line state signaling may be provided in a network as a remote service, and separated from processing of tone signaling data which may be provided as a separate function, carried out physically remotely from the handling of channel associated signaling processing. FIGS. 6 and 7 herein illustrate alternative packing of a single AAL 0 cell payload containing line state signaling data only.

Examples of line state signaling data include off hook (line seizure) signaling, on hook (seizure clear) signaling, Robbed bit signaling, and TS 16 signaling carried on G.703/721 frame structures.

Referring to FIG. 6 herein, there is illustrated a method for packing an AAL 0 cell 48 byte payload with channel associated signaling data from 4 T1 multiframes. Each T1 multiframe comprises channel associated signaling data of 4×12 bits, which is packed into 6 bytes of the AAL 0 payload, allowing CAS data from 96 DS0 circuits per AAL 0 cell payload. A sampling rate of 12 ms can be achieved using the packing method of FIG. 6.

Referring to FIG. 7 herein, there is shown an alternative packing method for packing channel associated signaling data of 3 E1 frames into a single AAL 0 48 byte payload, without packing tone signaling data. Each AAL 0 48 byte payload contains 4 bits of channel associated signaling data for each of 32 circuit switched E1 channels. A sampling rate of 6 ms is achieved using the packing scheme of FIG. 7 herein.

The TDM framer-cellifier 201 continuously generates AAL 0 cells containing CAS data as described herein before. The continuous stream of AAL 0 cells monitoring the plurality of circuit switched channels is input into monitoring processor 203. Monitoring processor 203 continuously polls the received AAL 0 cells on a periodic basis. When the CAS signaling relating to a particular channel changes, monitoring processor 203 checks for persistence of the change in CAS data for a predetermined period (typically 10 ms). Once a change in CAS data has persisted for the predetermined period, monitoring processor 203 outputs a second data frame type comprising a packet or cell having modified CAS data which is output to the call control processor of the local exchange, and which is then propagated by the exchange to other exchanges for signaling a change of line status along a circuit. In the best mode herein, the change in CAS data is signaled in an AAL 5 cell, although in other embodiments, other forms of packaging or cellification may be used. AAL 5 is selected because it contains cyclical redundancy code (CRC) in a last cell of a message, allowing detection of cell loss for cells transmitted between exchanges.

Since each circuit is bi-directional, monitoring processor 203 also operates bi-directionally. In a reverse direction, monitoring processor 203 receives input packets or cells containing CAS data signifying a change of status of a circuit (in the best mode herein in the form of an AAL 5 cell) and reconverts this CAS data into AAL 0 format, which is then passed back to TDM framer/cellifier 201, which is also bi-directional and unpacks the AAL 0 payload to recover CAS data for the plurality of circuit switched channels, which are then passed on to the subscriber terminals 100–103 signifying change of line status.

Hereinafter, there will be described a preferred best mode implementation in which a plurality of T1 circuits are handled by an ATM transport protocol.

Figure 8:
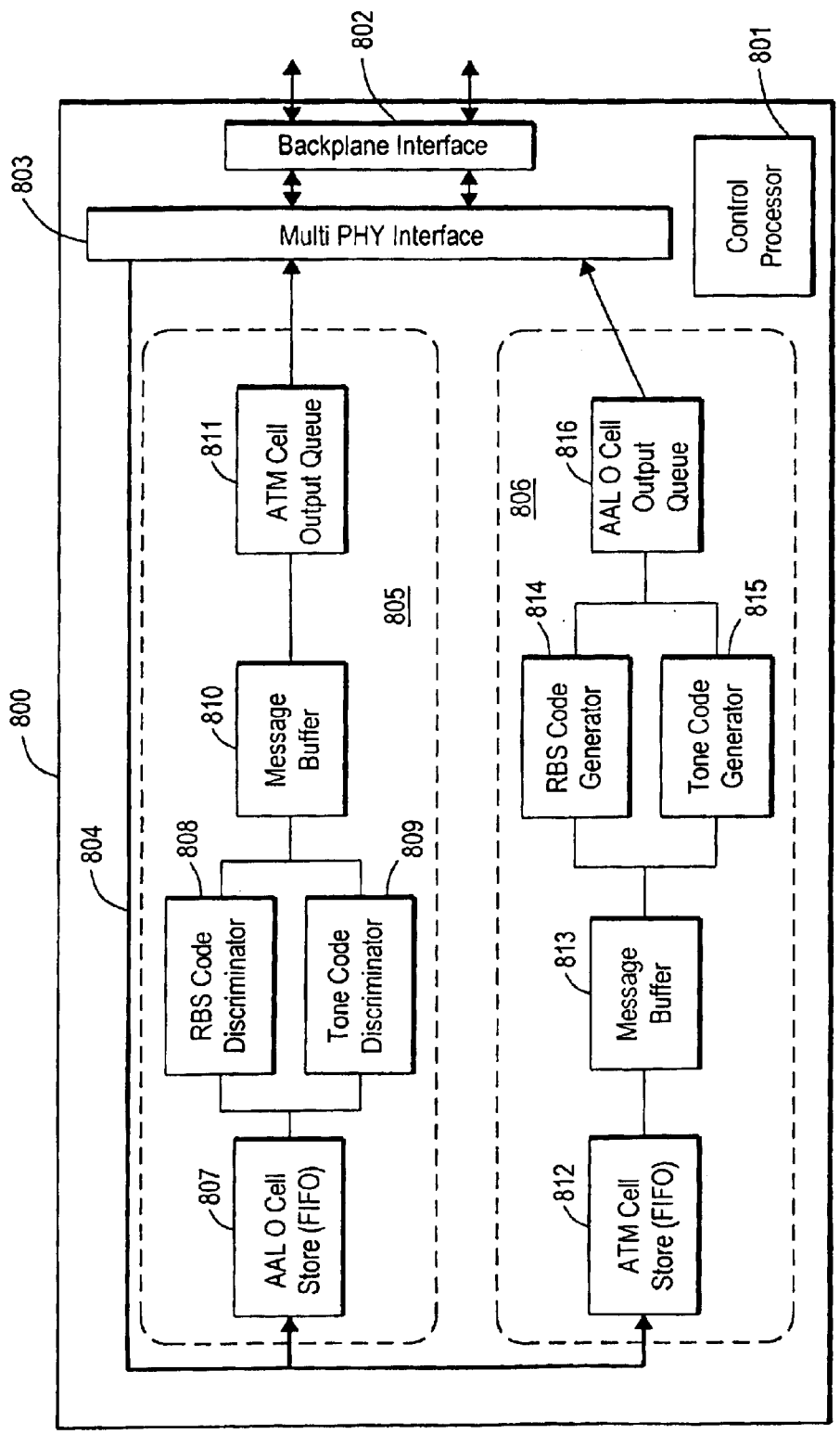
FIG. 8 illustrates schematically a monitoring processor configured for performing line state persistence measurements and monitoring on a plurality of extracted channel associated signaling data received in the form of ATM cell payloads.

Referring to FIG. 8 herein, there is illustrated a specific embodiment of monitoring processor 203 for handling a plurality of T1 circuit switched channels in an ATM transport protocol. Monitoring processor 800 comprises a control processor 801; an ATM back plane interface 802, a multiple physical interface 803 communicating with ATM back plane interface 802, the multiple physical interface communicating via an internal bus 804 with an input channel 805 for inputting a stream of AAL 0 cells and outputting AAL 5 cells, and an output channel 806 which receives a stream of AAL 5 cells for Internal bus 804 and outputs a plurality of AAL 0 cells back to multiple physical interface 803.

Input channel 805 comprises a first in-first out AAL 0 cell store 807; a robbed bit signaling code discriminator 808, receiving AAL 0 cells from cell store 807; optionally, a toned code discriminator 809 also receiving AAL 0 cells from cell store 807; a message buffer 810, and receiving an output of message buffer 810, an ATM cell output queue 811.

Output channel 806 comprises a second first in-first out ATM cell store 812, receiving a input of AAL 5 cells over bus 804; a message buffer 813 receiving AAL 5 cells from second cell store 812; a robbed bit signaling code generator 814 receiving AAL 5 cells from message buffer 813; optionally, a tone code generator 815 for generating tone code data in response to AAL 5 payload data received is from message buffer 813; and an AAL 0 cell output queue 816 outputting a plurality of AAL 0 cells to multiple physical interface 803.

Further structure and operation of the RBS code discriminator and tone code discriminator of input channel 805 will now be described with reference to FIGS. 8 and 9 herein. Processes described with reference to FIG. 9 run in parallel on a clocked basis. An AAL 0 cell is received in cell store 807, in step 900, where it is held temporarily pending input into RBS code discriminator 808 and tone code discriminator 809. The AAL 0 cell is stored in cell store 807 temporarily so as not to overload the processing power available in discriminators 808 and 809. When an AAL 0 cell is available in cell store 807, processing of the ABCD robbed bit signaling code is handled by RBS code discriminator 808, whereas processing of tone codes is handled by tone code discriminator 809. Because the AAL 0 cell contains a 5 byte header, the virtual circuit and virtual path to which the ATM payload relates is known from the header contents. The ATM cell header associates the cell with an E1 trunk. It is known in steps 901, 902, from the VCI and VPI information carried in the AAL 0 header, which trunk of a plurality N trunks the payload of the AAL 0 cell relates to. This provides a pointer to the beginning of the local memory storage area and from there the information as to how many circuits per trunk is stored, eg, 24 for T1 trunk, 32 for E1 trunk etc. Because the trunk is provisioned, the order of circuits within the trunk is known according to a predetermined packing algorithm used to pack the cells in the form as described with reference to FIG. 4, 5, 6 or 7 herein. Discriminators 808, 809 determine the circuit number, by counting bytes of the AAL 0 cell payload in step 902.

Monitoring processor 800 operates as a state machine, and for each circuit, maintains data describing a status of that circuit. Each discriminator 808, 809 comprises an internal memory store for storing data describing a line status of each of a plurality of circuits, and a data describing a time value for which that status has persisted. The status data is stored in a local memory of the monitoring processor. Discriminators 808, 809 inspect CAS data corresponding to each circuit in turn, working their way along the AAL 0 cell payload.

From the circuit number found from the AAL 0 cell header in step 701, the discriminators associate this circuit number with an area of local memory in step 902, the circuit number is indexed to point towards a base address in memory. Corresponding to data describing that circuit stored at the relevant base address is data describing which of a plurality of line status and tone signaling algorithms is currently being used for that circuit, and also a current status of the RBS data and tone data of that circuit. Retrieval of the algorithm number and retrieval of the current circuit status data are performed in parallel. In step 904, if a zero value is retrieved for the algorithm number, this denotes that there is no algorithm stored corresponding to that circuit. For a particular line circuit, particular line signals have specific meanings. These meanings can be retrieved by referencing the stored algorithm corresponding to that type of circuit. The particular algorithm is identified by the algorithm number stored in the memory location corresponding to that circuit in the local memory of the discriminators. The circuit number provides a pointer to one of a plurality of algorithms which are used to monitor persistence of a circuit state. A plurality of algorithms are required, so that the discriminators can handle a number of different frame protocols, for example T1, E1, OC3, depending upon the particular protocols in use in a network, and depending upon different persistence time values used in different territories and systems.

In step 904, the algorithm number is determined. If the algorithm number is set at zero, this denotes the line is unprovisioned, and in step 921, it is checked whether the circuit being inspected is the last circuit in a frame. If the circuit is not the last circuit, the circuit number is incremented in step 925, and steps 903, 904 repeat for the next circuit in the payload. If in step 921, the last circuit of the frame has been reached, it is checked in step 922 whether the end of the AAL 0 payload has been reached. If the end of the payload has been reached, in step 924 the next cell is input. However, if the end of the payload has not been reached (but the end of the frame has been reached at step 921), then in step 923 the circuit number is reset to the base address in local memory, and for the next section of the AAL 0 payload, steps 903, 904 are repeated for retrieval of the circuit status, and relevant algorithm number for successive circuits in the next frame contained in the AAL 0 cell payload. If in step 904, a non-zero value is retrieved for the algorithm, previous values of first and second persistence counters are retrieved in steps 905 and 906 respectively. The persistence counters load stored values recording the previous circuit status for each of the ABCD robbed bit signal bits and tone bits in step 907.

If in step 908, the same status for each of the first and second persistence values and the RBS bits and tone bits is the same as the last time a circuit was monitored, in step 909 an algorithm checks whether the circuit is idle, ie, whether the circuit is carrying traffic data or not. If the status of the circuit is idle, then it is checked whether this is the last circuit in the frame in step 921, and the procedures of steps 925, 922, 923 and 924 as described above are carried out. In general, circuits are provisioned, and may be either carrying data traffic, eg, voice data, or may be idle, pending carrying data traffic. As each circuit is sampled in turn, the test of step 909 determines whether traffic is being carried across the circuit or not on a period polled basis. Two ways of handling individual trunk circuits are possible; firstly, at the end of every call, a circuit can be de-provisioned, that is to say the algorithm value stored in the local memory corresponding to that circuit is reset to zero. Alternatively, the algorithm can be left in place, (in which case the circuit is provisioned), but the status check in step 909 will continue to return the 'idle' status. Thus, the two most frequent exit routes for a circuit will be either step 904 (there is no algorithm stored for the circuit, ie, the algorithm value stored in memory is 0), or in step 909, returning an idle status. Storing an algorithm whose number equals zero is a de-provisioned status, whereas storing an algorithm value not zero is a provisioned circuit status.

If in step 909 a non-idle status is determined, in step 911 the relevant persistence counter is incremented. In step 912, the incremented counter value is tested, to confirm the change of status of the circuit. Provided the change of status has persisted for a long enough predetermined period, ie, the counter value change has matured, then in step 914 there can either be an event message built based on the circuit number and an event number in step 920, or an external event message is not generated, but an internal status stored in the discriminator memory portion corresponding to that circuit is changed in steps 915–917. A test at step 914 determines whether the counter maturing represents a real change of status of the circuit significant enough to generate a circuit status change event, in which case an event message is built in step 920. However, if an event is not determined a current status information for the circuit is changed by retrieving a next state data from memory in step 915, resetting the appropriate counter values in step 916 and overwriting the current state information stored in memory in step 917. The RBS bits and tone bits are stored in step 918 and the counter bits are stored in step 919. The algorithm then returns to step 921 to check whether the circuit is the last circuit in the frame, and then on to subsequent steps as described herein above.

Figure 9:
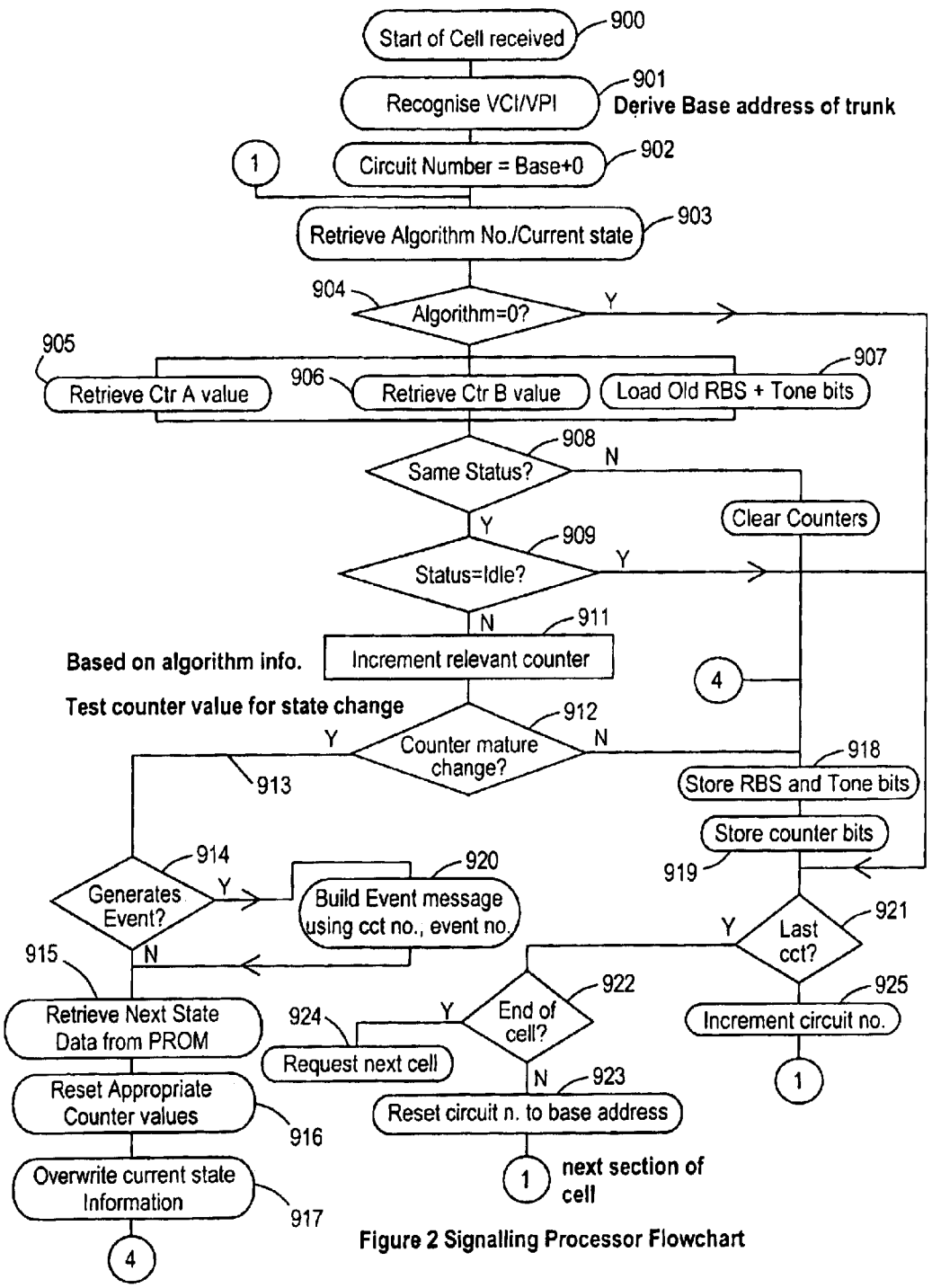
FIG. 9 illustrates schematically a persistence monitoring process operated by the monitoring processor of FIG. 8 herein.

The whole process of FIG. 9 repeats for each successive AAL 0 cell which is input into the discriminators 808, 809.

Referring to FIG. 10 herein, there is illustrated an example of changes of is data stored in a counter store area, data store area, algorithm input area, cell information area and equipped table information areas of a memory store of the discriminators over a successive number of clock cycles. For each circuit inspected, approximately 10 clock ticks are required to traverse the process illustrated with respect of FIG. 9 herein.

Figure 11:
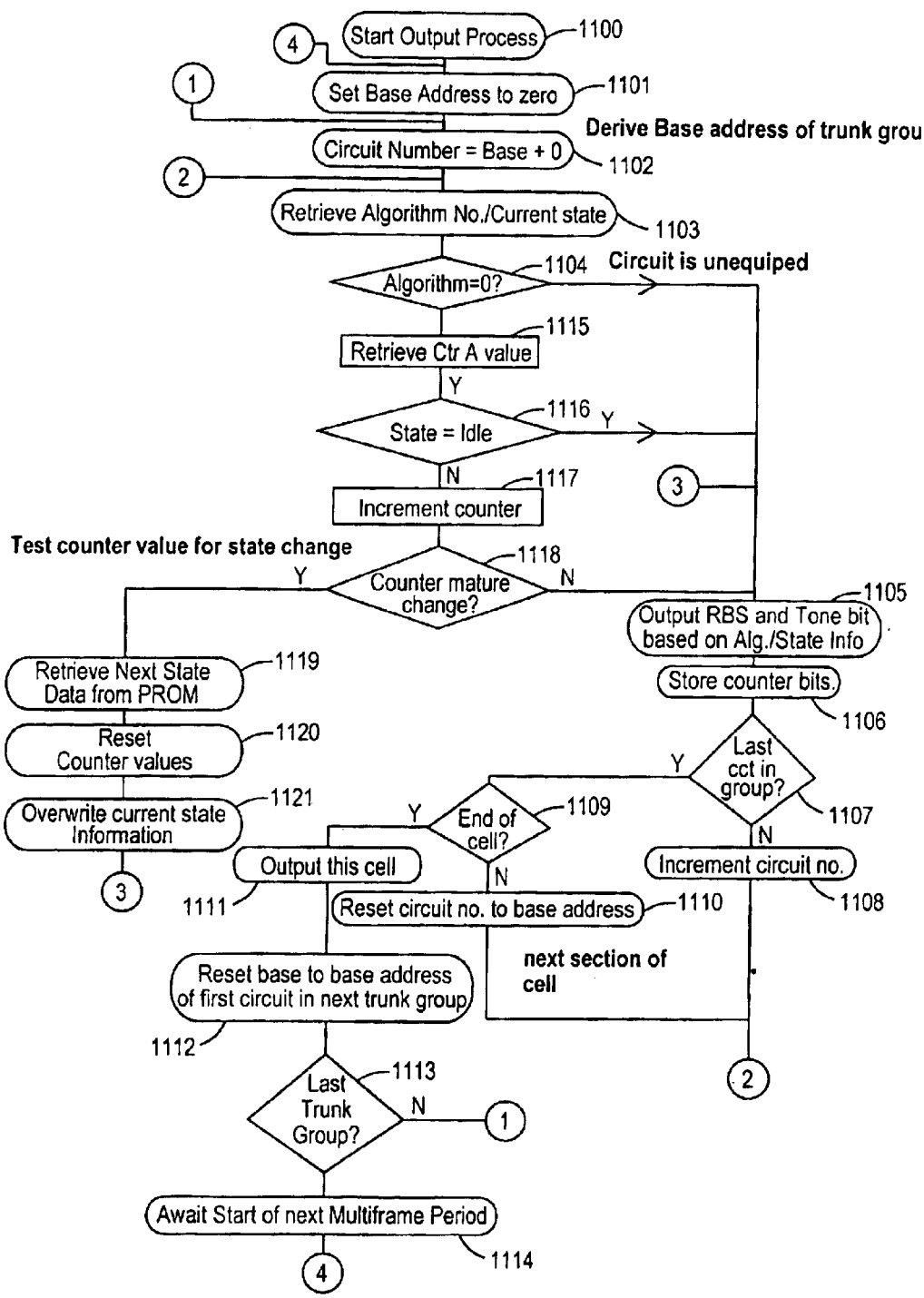
FIG. 11 herein illustrates a method of operation of a robbed bit signaling code generator and tone code generator comprising an output channel of monitoring processor of FIG. 8 herein.

Operation of output circuit 806 will now be described with reference to FIGS. 8, 11 and 12 herein.

Output circuit 806 receives event messages from a call control processor, contained within AAL 5 cell payloads via backplane interface 802, multiple physical interface 803 and internal bus 804. The output circuit only receives messages from the call control processor when the message contains an instruction to change a status of a circuit. Thus, operation of output circuit 806 is asynchronous, since operation depends upon asynchronously received AAL 5 contained event messages generated by the call control processor. Status change event messages are received from the call control processor on a per circuit basis. Whilst the output circuit receives circuit change status event messages asynchronously, in the form of AAL 5 contained messages, the output circuit outputs a continuous stream of AAL 0 cell containing CAS data having RBS bits and tone bits arranged as illustrated with reference to FIG. 4 to 7 herein, signifying the status of the circuit with respect to robbed bit signaling, and tone bits.

The output block 806 acts as an AAL 5 to AAL 0 cell processor. An AAL 5 message received by output circuit 806 contains data describing a circuit number, and circuit state change information, eg, an answer signal. The output circuit 806 acts as a state machine. Reception of an AAL 5 message triggers the output circuit to adopt a new sequence of states describing the line circuits. For each line circuit, output circuit 806 adopts a stable state in which it continuously outputs AAL 0 cells, whilst awaiting a new AAL 5 message input, which triggers the output circuit to adopt a new output state of continuously produced AAL 0 cells. Particular states, eg, dialing a number causes the output circuit to be forced into a next chain of states.

The output circuit 806 processes each circuit number sequentially, and if provisioned, retrieves its current state, current counter values and determines whether to update the counter. On the basis of the updated state and counter values, the relevant RBS/tone signaling bits are scheduled for that circuit. The information for the circuits within a trunk group is gathered together across the trunk and built into an AAL 0 cell with the trunk virtual circuit number, and is issued as a stream of AAL 0 cells.

To ensure an even rate of cell generation, circuit numbers are handled sequentially based on a clock tick used as a frame synchronization pulse. A constraint that all circuits within a T1 trunk are sequentially numbered enables the AAL cell to be built. Unprovisioned trunks do not generate cells, thus additional cell delay variation (CDV) will occur whenever new trunks are provisioned in or out, as provisioning alters the number of AAL 0 cells generated. Unused but provisioned trunks (ie, trunks in an idle state with circuits not carrying traffic) are still represented in the AAL 0 cell payloads, in order to maintain continuity of signaling.

ATM cell store 600 receives AAL 5 cells from the call control processor. The AAL 5 cells are buffered in message buffer 809 and input into RBS code generator 814 and tone code generator 815, each of which act as a state machine and interpret a message contained in an AAL 5 cell payload as a change state message. Each of RBS code generator 814 and tone code generator 815 continuously produce codes describing channel associated signaling for each circuit. RBS code generator 814 and tone generator 815 are initially set up according to predetermined algorithms and a current state for each circuit (the circuit is normally initialized as an 'idle state'), and when AAL 5 contained messages arrive from the call control processor, the state machines within each of the RBS code generator 814 and tone code generator 815 are modified in response to the changed states designated in the AAL 5 event data. RBS code generator 814 and tone code generator 815 continuously produce a stream of AAL 0 cells having a 48 byte payload formatted similarly as described with reference to FIGS. 4 to 7 herein. Each circuit is represented within the AAL 0 cell payload, and a state of each circuit is designated by the RBS bits and/or tone bits contained in the AAL 0 cell payload. Generation of AAL 0 cell payload frames is handled strictly in circuit sequence order so that the payloads are built up in time sequence order.

In other words, when an AAL 5 event message arrives, it is input asynchronously into RBS code generator 814. However, RBS code generator 814 (and similarly tone code generator 815) are continuously building AAL 0 cells under local clock control synchronously. Thus, asynchronously received AAL 5 cells alter the synchronous AAL 0 cell output upon their receipt at the RBS code generator 814 and tone code generator 815. AAL 0 cells are continuously put onto AAL 0 cell output queue 816 prior to loading onto the multi-physical interface 803 and then onto the backplane interface 802. The rate at which AAL cells are output from output queue 816 onto the multiple physical interface 803 is controlled, and regulated so as to minimize its effect on the balance of traffic on back plane interface 802, and to produce a regulated cell output onto back plane interface 802.

RBS code generator 814 and tone generator 815 operate processes as described with reference to FIG. 11 herein.

In step 1100, the output process is triggered by receipt of an AAL 5 cell in ATM cell store 812. AAL 0 cell generation process operates on a continuous basis. The AAL 5 cell is buffered in message buffer 813, pending input to RBS code generator 814 and tone code generator 815.

For the payload of each AAL 0 cell, each circuit is addressed in sequence. On receipt of an AAL 5 cell, in step 1101 a base address is set to zero in the state machine comprising RBS code generator 014 and tone code generator 815. The AAL 5 cells contain frames of CAS data packaged similarly as described herein before with reference to AAL 0 cells. In step 1102, the circuit number of an individual circuit within a trunk is incremented to the base address plus 0. In step 1103, one or a plurality of packing algorithms for packing the frames to be into the AAL 0 payload is retrieved. The different packing algorithms are predetermined, and depend upon the environment of the monitoring processor, ie, its geographical location and the type of network within which it is installed, eg, T1 circuits, E1 sub-base systems etc. In step 1103, a current state of the RBS bits and tone bits is also set. On startup, a default state condition is entered, but for successive cell outputs, the previous current state is input into the payload. In step 1104, if the retrieved algorithm number is zero, this is equivalent to an unprovisioned circuit, in which case the robbed bit signaling bits and tone bits are entered into the frame address for that particular circuit based on the algorithm number zero and current state information in step 1105. In step 1106, counter bits are stored and in step 1107 it is checked whether the circuit in the frame is the last circuit of that frame. If the currently inspected circuit is not the last circuit in the frame, then the circuit number is incremented in step 1108, and the next circuit in the frame has its algorithm number retrieved and current state retrieved in step 1103 and the process continues as described previously. On the other hand, if the last circuit in the frame has been reached in step 1107, in step 1109 it is determined whether the end of the 48 byte cell payload has been reached. If the end of the cell payload has not been reached, the circuit number is reset to the base address, and the next frame of the cell is processed from step 1103 onwards. However, if the end of the ATM cell payload has been reached, the AAL 0 cell is output in step 1111 and the base address is reset to the base address of the first circuit in the next trunk group in step 1112 for packaging of CAS data relating to the next trunk group into a next AAL 0 cell. In step 1113 it is checked whether the trunk group is the last trunk group, and if the current trunk group is not the last trunk group, the circuit number of a new trunk group is set in step 1102 and the process continues as described previously. However, if the trunk group is the last, then in step 1114 the start of a next multi-frame period is awaited following which a base address is set to zero in step 1101 and the process continues as described previously, for the next multi-frame.

In the case of a provisioned circuit detected by an algorithm number not equal to zero in step 1104, a counter value A is retrieved in step 1105, and in step 1106 it is determined whether the status of the line is idle or not. If the line is provisioned but idle, then RBS bits and tone bits based on the current algorithm and state information are entered into the relevant portion of the frame for that particular circuit in step 1105 and the process moves on to the next circuit as described previously with reference to steps 1106–1114. However, if in step 1106 the state of the circuit is not idle, a counter is incremented in step 1107 and in step 1108 it is determined whether the changed state is persistent, from the incremented counter number produced in step 1107. If persistence does not exist, then the previous RBS bits and tone bits based on the previous algorithm and state information is continued to be output into the relevant portion of the AAL 0 cell frame payload in steps 1105–1114 as described previously. However, if a persistent change of circuit state is determined in step 1108, ie, if the counter value has been tested for a state change and that test has resulted in a positive result, in step 1119 a next state data is received from a programmable read only memory and counter values are reset in step 1120. The current state information contained in the relevant portion of the AAL 0 cell payload relating to that circuit is overwritten in step 1121, and output in steps 1105–1114 onwards as described previously. Referring to FIG. 12 herein, there is illustrated schematically an example of changes of data within the state machine represented by the process of FIG. 11 herein and the robbed bit signaling code generator means 814 and tone generator means 815. Data stores within the state machine comprise a counter store, an algorithm programmable read only memory input, and an 16 bit equipped table. Data in the data stores is updated with successive data clock ticks, the data clock ticks effectively being driven by receipt of AAL 5 message data packets in the output circuit.

What is claimed is:

1. A method for processing channel associated signaling data of a plurality of communications channels, said method comprising the steps of:

extracting channel associated signaling data from channel signaling carried on each of said plurality of communications channels;

assembling said extracted channel associated signaling data of said plurality of communication channels into at least one data frame;

monitoring a plurality of said data frames to detect changes of line status of said plurality of communications channels; and generating an event message data frame in response to a detected change of status; wherein said step of monitoring a plurality of said data frames comprises:

checking a persistence of a change of line status by counting a number of said data frames over which channel associated signaling describing said change of line status persists.

2. The method as claimed in claim 1, further comprising the step of:

inserting an event message data frame into a transport carrier payload.

3. The method as claimed in claim 2, wherein a transport carrier payload comprises a payload in accordance with a protocol selected from the set:

Asynchronous Transfer Mode (ATM);

Transmission Control Protocol (TCP);

Synchronous Digital Hierarchy (SDH).

4. The method as claimed in claim 1, wherein an event message data frame is inserted into an AAL 5 cell payload.

5. The method as claimed in claim 1, wherein said step of monitoring a plurality of said data frames comprises:

sequentially inspecting each of a plurality of data locations within a data frame, each said data location corresponding to an individual said communications channel; and comparing a content of each said data location within said data frame with a corresponding data location stored in a data storage device, said corresponding stored data location containing stored data relating to a previous state of said corresponding communications channel.

6. The method as claimed in claim 1, wherein said step of assembling said extracted channel associated signaling data into a least one data frame comprises;

assembling channel associated data of at least one trunk into a single said data frame.

7. The method as claimed in claim 1, wherein channel associated signaling data corresponding to a trunk selected from the set:

a T1 trunk;

an E1 trunk;

an OC3 trunk;

an STM 1 frame;

is assembled into a single said data frame.

8. The method as claimed in claim 1, wherein a data frame comprises an AAL 0 48 byte payload.

9. The method as claimed in claim 1, further comprising the step of outputting said event message data frames asynchronously in response to a detected change of status.

10. A method of processing channel associated signaling data of a plurality of line circuits, said method comprising the steps of:

assembling channel associated signaling data describing a current status of each of a plurality of said line circuits into a first data frame;

for each said line circuit, storing historical status data in a memory area;

for each said line circuit, comparing current status data describing the current status of said line circuit contained in said first data frame with said historical stored data; and if said current status data in said first data frame differs from said stored historical status data, assembling a second data frame type containing said current status data;

and wherein a first data frame comprises an AAL5 payload.

* * * * *